United States Patent
Feng et al.

(10) Patent No.: US 11,347,075 B2
(45) Date of Patent: May 31, 2022

(54) SUSPENSION ASSEMBLY OF OPTICAL IMAGE STABILIZER

(71) Applicant: SAE MAGNETICS (H.K.) LTD., Hong Kong (CN)

(72) Inventors: Xianwen Feng, Hong Kong (CN); Ying Xiao, Hong Kong (CN)

(73) Assignee: SAE MAGNETICS (H.K.) LTD., Hong Kong (CN)

( * ) Notice: Subject to any disclaimer, the term of this patent is extended or adjusted under 35 U.S.C. 154(b) by 183 days.

(21) Appl. No.: 16/731,651

(22) Filed: Dec. 31, 2019

(65) Prior Publication Data

US 2020/0218083 A1 Jul. 9, 2020

(30) Foreign Application Priority Data

Jan. 3, 2019 (CN) .......................... 201910004717.6

(51) Int. Cl.
G02B 27/64 (2006.01)
H04N 5/232 (2006.01)
G02B 7/02 (2021.01)

(52) U.S. Cl.
CPC .......... *G02B 27/646* (2013.01); *G02B 7/026* (2013.01); *H04N 5/23264* (2013.01); *G03B 2205/0076* (2013.01)

(58) Field of Classification Search
CPC ............................. G02B 7/026; G02B 27/646
See application file for complete search history.

(56) References Cited

U.S. PATENT DOCUMENTS

| | | | | |
|---|---|---|---|---|
| 2008/0189919 A1* | 8/2008 | Keefer | ............... | G06F 3/04164 24/563 |
| 2015/0253583 A1* | 9/2015 | Cho | .................... | H02K 11/215 348/360 |
| 2017/0357076 A1* | 12/2017 | Scheele | ................. | G02B 7/026 |
| 2019/0025540 A1* | 1/2019 | Shin | ........................ | G02B 7/09 |
| 2020/0033699 A1* | 1/2020 | Kim | ........................ | G02B 7/08 |

FOREIGN PATENT DOCUMENTS

WO WO-2017155296 A1 * 9/2017 ............... G03B 3/12

\* cited by examiner

*Primary Examiner* — Noam Reisner
(74) *Attorney, Agent, or Firm* — Nixon & Vanderhye, P.C.

(57) ABSTRACT

The present invention relates to the field of camera shake reduction technology and discloses a suspension assembly of OIS, which comprises a printed circuit board and a spring plate movably disposed on the printed circuit board, wherein the printed circuit board is electrically connected with the spring plate, the printed circuit board comprises a substrate plate and a bend portion extending downwards along any side edge of the substrate plate, a support component is attached to a bottom surface of the substrate plate, a plurality of conductive terminals are arranged on an outside surface of the bend portion, a plurality of reinforce components are arranged on an inside surface of the bend portion and corresponding to the plurality of conductive terminals one to one, and the plurality of reinforce components are placed at intervals and do not contact with each other.

9 Claims, 3 Drawing Sheets

SUSPENSION ASSEMBLY OF OPTICAL IMAGE STABILIZER

CROSS-REFERENCE TO PRIOR APPLICATION

This application claims the benefit of Chinese Patent Application No. 201910004717.6 filed on Jan. 3, 2019, the contents of which are incorporated herein by reference.

FIELD OF THE INVENTION

The present invention relates to the field of camera shake reduction technology, more particularly to a suspension assembly of an optical image stabilizer.

BACKGROUND OF THE INVENTION

Optical Image Stabilizer (OIS) is mainly applicable to photography devices. The principles of operation of OIS are as follows. During a photographing operation, when a slight movement is detected by means of a gyro, a signal is sent to a processor, and an amount of motion for compensation is calculated immediately by means of the processor, then a displacement compensation can be carried out for the lens assembly to counteract the shaking, thereby effectively reducing image blur caused by the shaking of photography devices.

The suspension assembly which forms the principal part of OIS serves to drive the lens assembly to move based on the calculation performed by the processor, to realize displacement compensation. The suspension assembly mainly comprises a printed circuit board 10 and a spring plate movably disposed on the printed circuit board 10. Since the printed circuit board 10 is flexible, it is necessary to arrange, on a backside of the printed circuit board 10, a support component 13 which extends to an inner side surface of the bend portion from the substrate plate of the printed circuit board 10. In particular, referring to FIG. 1, since the support component 13 is usually made of conductive materials such as metal, when soldering the bend portion of the printed circuit board 10 and other components, conductive terminals of the printed circuit board 10 may be in electrically conductive communication with the support component due to the weld molten zone, such that conductive terminals of the printed circuit board 10 may be in electrically conductive communication with each other by the support component, then resulting in a short circuit on the printed circuit board 10.

SUMMARY OF THE INVENTION

To overcome shortcomings in existing technology, the present invention provides a suspension assembly of OIS, which can avoid the short in the printed circuit board during the soldering process.

In order to achieve the above goal, the present invention provides a suspension assembly of OIS, which comprises a printed circuit board and a spring plate movably disposed on the printed circuit board, wherein the printed circuit board comprises a substrate plate and a bend portion extending downwards along any side edge of the substrate plate, a support component is attached to a bottom surface of the substrate plate, a plurality of conductive terminals are arranged on an outside surface of the bend portion, a plurality of reinforce components are arranged on an inside surface of the bend portion and corresponding to the plurality of conductive terminals one to one, and the plurality of reinforce components are placed at intervals and do not contact with each other.

In a preferred embodiment, the reinforce components of the suspension assembly of the OIS do not contact with the support component.

In a preferred embodiment, at least one of the reinforce components of the suspension assembly of the OIS connects with the support component.

In a preferred embodiment, the reinforce component which is connected with the support component may be disposed at a middle position in a length direction of the bend portion.

In a preferred embodiment, the support component may extend over the bottom surface of the substrate plate, extend over a connection corner between the substrate plate and the bend portion, and extend to the inside surface of the bend portion.

In a preferred embodiment, the bend portion may be provided with through holes extending there-through from outside to inside, the through holes may be filled with dielectric medium, and the support component may be connected with one of the conductive terminals by the dielectric medium, or, one of the reinforce components may be connected with respective corresponding conductive terminal by the dielectric medium.

In a preferred embodiment, the support component and the reinforce components may be made of stainless steel material.

In a preferred embodiment, a shape memory alloy wire may be connected between the printed circuit board and the spring plate.

In a preferred embodiment, the suspension assembly of the OIS may further comprise a base plate, the substrate plate may be attached to a top surface of the base plate, and the base plate may be provided with a through slot through which the bend portion can pass.

In a preferred embodiment, a bearing may be further arranged between the printed circuit board and the spring plate.

Compared with the existing technology, the present invention has advantages as follows.

In the suspension assembly of OIS according to embodiments of the present invention, the support component and the plurality of reinforce components are separately arranged on the bottom surface of the substrate plate of the printed circuit board and the inside surface of the bend portion, ensuring the strength of the printed circuit board. Furthermore, the plurality of reinforce components are arranged corresponding to the plurality of conductive terminals arranged on the printed circuit board one to one, and the reinforce components do not contact or connect with each other. In this way, even the reinforce component is in electrical communication with corresponding conductive terminal by the weld molten zone during the soldering process of the printed circuit board, the conductive terminals are prevented from being in electrical communication with each other, and a short in the printed circuit board during the soldering process can be avoided.

Figure 1:
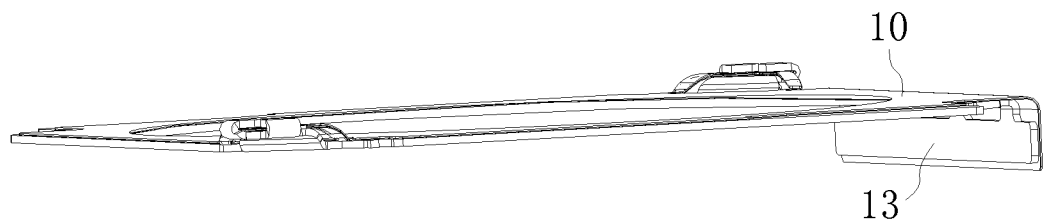
FIG. 1 is a schematic view of a printed circuit board of a suspension assembly of OIS illustrated in the background.

In the drawings: 10. printed circuit board; 11. substrate plate; 12. bend portion; 121. through holes; 13. support component; 14. conductive terminals; 15. reinforce components; 20. spring plate; 30. shape memory alloy wire; 40. base plate; 41. through slot.

DETAILED DESCRIPTION OF ILLUSTRATED EMBODIMENTS

Examples of the present invention will be further explained below in detail with reference to figures and particular embodiments. The following examples illustrate the present invention but are not intended to limit the scope of the invention.

It should be understood that, terms such as "upper", "lower", "left", "right", "top" and "bottom" as used in the description, refer to position and orientation relationships in accordance with drawings for convenience of description and for the purpose of simplicity. They are not intended to indicate or hint a limitation in terms of specific orientation or configuration and operation with specific orientation to the described device or element and should not be regarded as limiting.

Embodiment 1

Referring to FIGS. 2-5, a suspension assembly of OIS is provided in the embodiment, which comprises a printed circuit board 10 and a spring plate 20 movably disposed on the printed circuit board 10, wherein the printed circuit board 10 is electrically connected with the spring plate 20, the printed circuit board 10 comprises a substrate plate 11 and a bend portion 12 which extends downwards along anyone of the side edges of the substrate plate 11, a support component 13 is attached to a bottom surface of the substrate plate 11, a plurality of conductive terminals 14 are arranged on an outside surface of the bend portion 12, a plurality of reinforce components 15 are arranged on an inside surface of the bend portion 12 and corresponding to the plurality of conductive terminals 14 one to one, wherein the plurality of reinforce components 15 are placed at intervals and do not contact with each other. The insulative backside of the printed circuit board 10 ensures that the reinforce components 15 are not in electrical communication with each other. It should be noted that, the conductive terminals 14 in the embodiment serve as interfaces for connecting circuits of the printed circuit board 10 with external circuits.

In the embodiment, the suspension assembly of OIS makes a contribution over the prior art mainly in that, the support component 13 and the reinforce components 15 are respectively arranged on the bottom surface of the substrate plate 11 of the printed circuit board 10 and the inside surface of the bend portion 12, and the reinforce components 15 are arranged corresponding to the conductive terminals 14 arranged on the outside surface of the bend portion 12 one to one. In this way, both the support component 13 and the reinforce components 15 can reinforce and support the printed circuit board 10, whereby the strength of the printed circuit board 10 can be ensured. Furthermore, in particular referring to FIG. 4, the reinforce components 15 do not contact with each other, and the reinforce components 15 and the support component 13 are separately arranged. With such arrangement, during the soldering of the bend portion 12 of the printed circuit board 10 and other components of OIS, the conductive terminals 14 are not in electrical communication with each other even one or more of conductive terminals 14 and respective corresponding reinforce components 15 are connected by the weld molten zone produced in the soldering process. In this way, a short in the printed circuit board 10 during the soldering process can be effectively avoided.

The suspension assembly of OIS according to the embodiment of the present invention is mainly applicable to photography devices such as phonecams and cameras. Herein, the spring plate 20 is used for mounting the lens assembly. When a photography device is held by hand, in case of a slight shaking, the spring plate 20 is controlled to move by means of the printed circuit board 10, such that the lens assembly arranged on the spring plate 20 can be controlled to move, thereby counteracting the shaking and realizing compensation, achieving focusing by the lens assembly, and reducing image blur caused by the shaking during the photographing operation.

Figure 3:
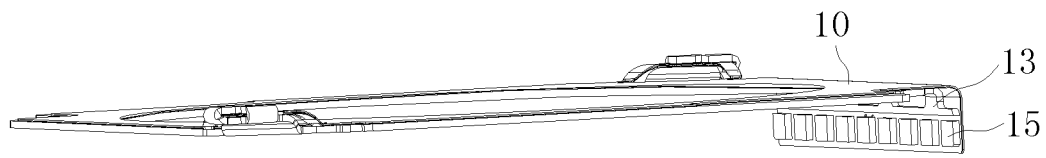
FIG. 3 is a schematic view of the printed circuit board of the suspension assembly of OIS according to the first embodiment of the present invention.
Figure 4:
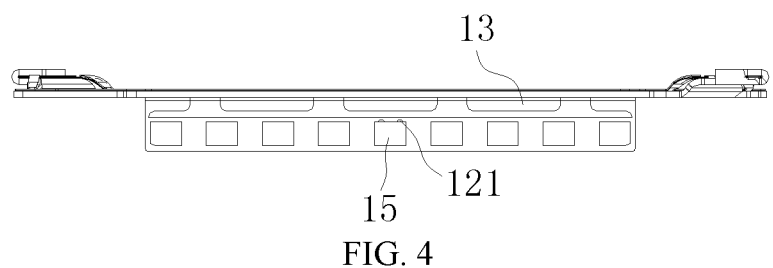
FIG. 4 is another schematic view of the printed circuit board of the suspension assembly of OIS shown in FIG. 3.
Figure 5:
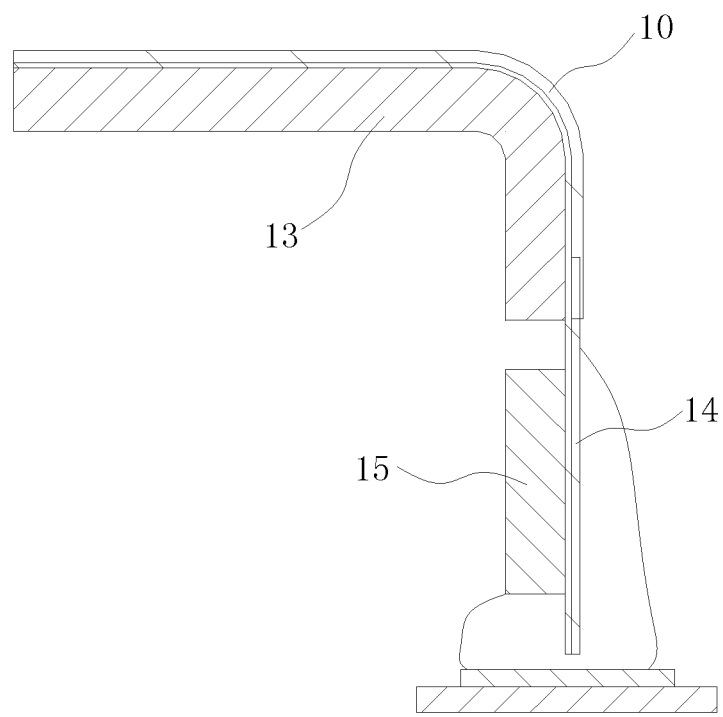
FIG. 5 illustrates the printed circuit board of the suspension assembly of OIS according to the first embodiment of the present invention, which is mounted on OIS.

Then, referring to FIGS. 3 and 4, based on the above technical solution, in the suspension assembly of OIS in the embodiment, the reinforce components 15 may do not contact with the support component 13, and thus the reinforce components 15 are not in electrical communication with the support component 13. In this way, an electrical communication between the reinforce components 15 achieved by the support component 13 can be avoided, then an electrical communication between the reinforce components 15 during the soldering process can be avoided, and then a short in the printed circuit board 10 during the soldering process can be avoided.

In particular, in order to strengthen the printed circuit board 10, the support component 13 may extend over the bottom surface of the substrate plate 11, extend over the connection corner between the substrate plate 11 and the bend portion 12, and extend to the inside surface of the bend portion 12, thereby overcoming the problem of insufficient strength of the connection corner between the substrate plate 11 and the bend portion 12 of the printed circuit board 10.

Preferably, in particular referring to FIGS. 3 and 4, the bend portion 12 in the embodiment may be provided with through holes 121 extending there-through from outside to inside. The through holes 121 may be filled with dielectric medium (not shown), and one of the reinforce components 15 may be electrically connected with the corresponding conductive terminal 14 by the dielectric medium to provide grounding for the printed circuit board 10. Alternatively, one of the conductive terminals 14 may be connected with the support component 13 by the dielectric medium, i.e., one of the conductive terminals 14 may be in electrical communication with the support component 13, whereby the grounding for the printed circuit board 10 can also be provided.

In the embodiment, for ease of production and low cost, the support component 13 and the reinforce components 15 may be made of stainless steel material.

Referring to FIG. 2 again, in the embodiment, a shape memory alloy wire 30 may be connected between the printed circuit board 10 and the spring plate 20. In an exemplary embodiment, four shape memory alloy wires 30 may be provided, which four shape memory alloy wire 30 may form a rectangle in parallel with the plane of the substrate plate 11, one end of the shape memory alloy wires 30 may be connected with the printed circuit board 10, another end of the shape memory alloy wire 30 may be connected with the spring plate 20, and the spring plate 20 can be driven by the four shape memory alloy wires 30 to move in the plane of the formed rectangle, to achieve position compensation for the lens assembly.

Figure 2:
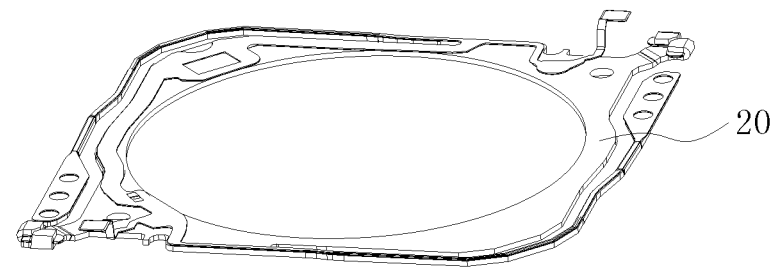
FIG. 2 is an exploded view of a suspension assembly of OIS according to a first embodiment of the present invention.
Figure 2:
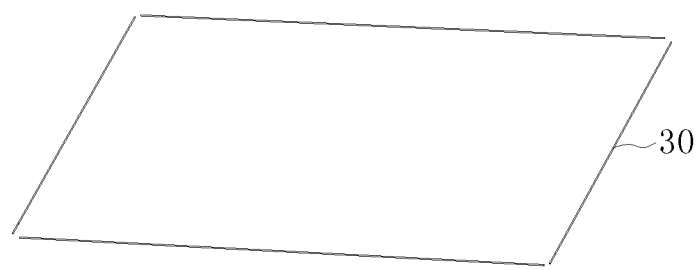
Figure 2:
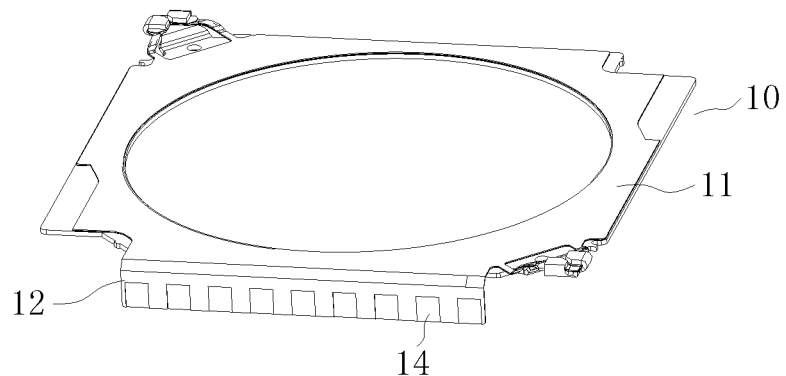
Figure 2:
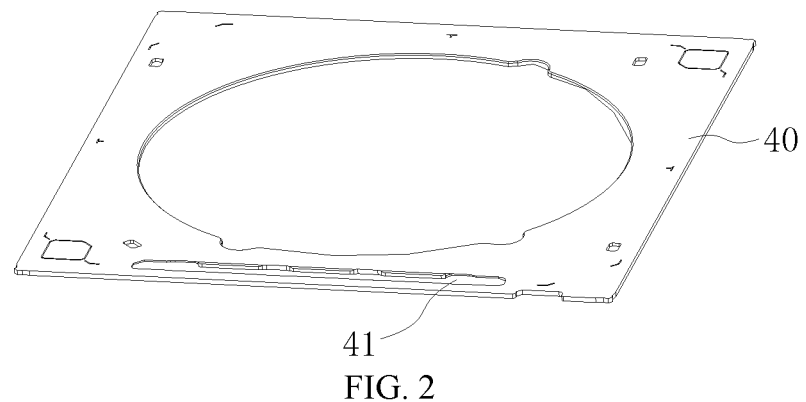

Referring to FIG. 2, the suspension assembly of OIS in the embodiment may further comprise a base plate 40, the substrate plate 11 may be attached to the top surface of the base plate 40, and the base plate 40 may be provided with a through slot 41 through which the bend portion 12 can pass. The base plate 40 functions to support the printed circuit board 10. The base plate 40 and the printed circuit board 10 together form the fixed portion of the suspension assembly, and the spring plate 20 forms the movable portion of the suspension assembly In an exemplary embodiment, in order to reduce the vibration and noise generated during the compensation process by OIS, bearings (not shown) may be further arranged between the printed circuit board 10 and the spring plate 20. By means of the bearings, the spring plate 20 and the lens assembly arranged thereon are supported and arranged on the printed circuit board 10, and the spring plate is allowed to move with a sufficient flexibility.

Embodiment 2

Figure 6:
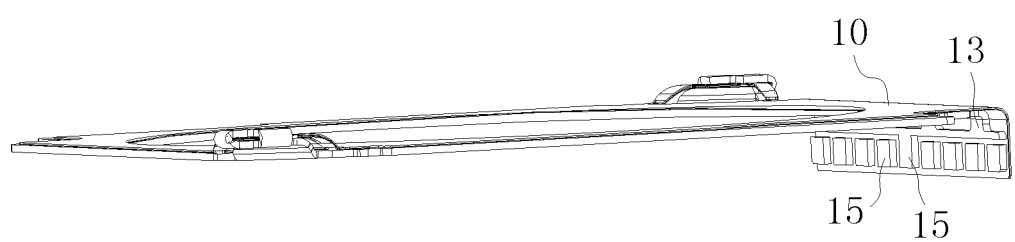
FIG. 6 is a schematic view of a printed circuit board of a suspension assembly of OIS according to a second embodiment of the present invention.
Figure 7:
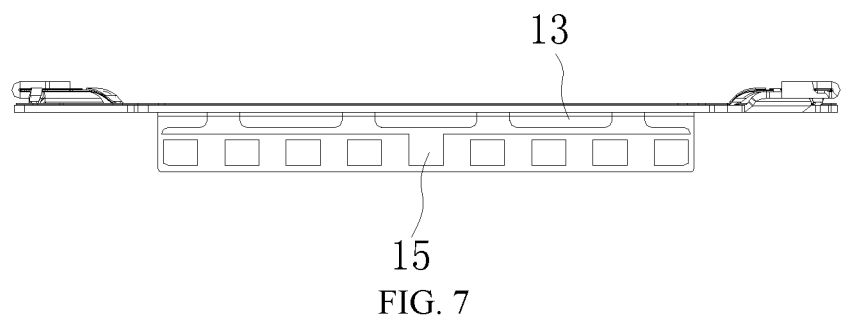
FIG. 7 is another schematic view of the printed circuit board of the suspension assembly of OIS shown in FIG. 6.

A suspension assembly of OIS is provided in the Embodiment 2 of the present invention, which differs from the Embodiment 1 in the structure of the printed circuit board 10. In particular, FIGS. 6 and 7 are schematic views of the printed circuit board of the suspension assembly of OIS in the present embodiment. In the embodiment, the printed circuit board 10 is also arranged with a plurality of reinforce components 15 which do not contact with each other. However, at least one of the reinforce components 15 is connected with the support component 13. Such direct connection between the support component 13 and the reinforce component 15 can further ensure the strength of the printed circuit board 10.

In the embodiment, in order to further improve the strength of the printed circuit board 10, the reinforce component 15 which is connected with the support component 13 may be disposed at the middle position in the length direction of the bend portion 12.

Referring to FIG. 7, in the embodiment, exemplarily only one of the reinforce components 15 arranged on the printed circuit board 10 is directly connected with the support component 13, and the one reinforce component 15 is disposed at the middle position in the length direction of the bend portion 12. Furthermore, in the embodiment, the reinforce component 15 directly connected with the support component 13 is electrically connected with the printed circuit board 10, i.e., through holes 121 (not shown in FIGS. 6 and 7) are provided on the back surface of the reinforce component 15 directly connected with the support component 13, to ensure the grounding for the printed circuit board 10.

Other features of the suspension assembly of OIS in the present embodiment are the same as those in the Embodiment 1 and are not repeated here.

Overall, a suspension assembly of OIS is provided in the embodiments of the present invention, the support component 13 and the reinforce components 15 are respectively arranged on the back surface of the substrate plate 11 of the printed circuit board 10 and the back surface of the bend portion 12, whereby the printed circuit board 10 can be reinforced and supported to meet the strength demand of the printed circuit board 10. Furthermore, the plurality of reinforce components 15 are arranged corresponding to the conductive terminals 14 arranged on the outside surface of the bend portion 12 one to one, and the reinforce components 15 do not contact with each other. With such arrangement, even the reinforce component 15 is in electrical communication with corresponding conductive terminal 4 by the weld molten zone during the soldering process of the printed circuit board 10, the conductive terminals 14 are not in electrical communication with each other. In this way, a short in the printed circuit board 10 during the soldering process can be avoided.

All the above are merely some preferred embodiments of the present invention. It should be noted that, those skilled in the art may obtain modifications and equivalents without departing from the technical principal of the present invention. The present invention is intended to cover all modifications and equivalent arrangements included within the scope of the present invention.

The invention claimed is:

1. A suspension assembly of an optical image stabilizer, wherein the suspension assembly comprises a printed circuit board and a spring plate movably disposed on the printed circuit board, wherein the printed circuit board comprises a substrate plate and a bend portion extending downwards along any side edge of the substrate plate, a support component is attached to a bottom surface of the substrate plate, a plurality of conductive terminals are arranged on a front surface of the bend portion, a plurality of reinforce components are arranged on a back surface of the bend portion and corresponding to the plurality of conductive terminals one to one, and the reinforce components are disposed at intervals and do not contact with each other, wherein the bend portion is provided with a through hole extending there-through from front to back, and the through hold is filled with dielectric medium; and the support component is connected with one of the conductive terminals by the dielectric medium, or, one of the reinforce components is connected with a corresponding conductive terminal by the dielectric medium.

2. The suspension assembly according to claim 1, wherein the reinforce components do not contact with the support component.

3. The suspension assembly according to claim 1, wherein at least one of the reinforce components connects with the support component.

4. The suspension assembly according to claim 3, wherein the reinforce component which connects with the support component is disposed at a middle position in a length direction of the bend portion.

5. The suspension assembly according to claim 1, wherein the support component extends over the bottom surface of the substrate plate, extends over a connection corner between the substrate plate and the bend portion, and extends to the back surface of the bend portion.

6. The suspension assembly according to claim 1, wherein the support component and the reinforce components are made of stainless steel material.

7. The suspension assembly according to claim 1, wherein a shape memory alloy wire is connected between the printed circuit board and the spring plate.

8. The suspension assembly according to claim 1, wherein a base plate is further provided, the substrate plate is attached to a top surface of the base plate, and the base plate is provided with a through slot through which the bend portion can pass.

9. The suspension assembly according to claim 1, wherein a bearing is further arranged between the printed circuit board and the spring plate.

* * * * *